(12) United States Patent
Thwaites et al.

(10) Patent No.: US 11,592,007 B2
(45) Date of Patent: Feb. 28, 2023

(54) EQUIPOTENTIAL BONDING OF WIND TURBINE ROTOR BLADE

(71) Applicant: Vestas Wind Systems A/S, Aarhus (DK)

(72) Inventors: Angela Thwaites, Cowes (GB); Toby Collard, Cowes (GB); Robert Hunter, Cowes (GB)

(73) Assignee: Vestas Wind Systems A/S, Aarhus N (DK)

( * ) Notice: Subject to any disclaimer, the term of this patent is extended or adjusted under 35 U.S.C. 154(b) by 0 days.

(21) Appl. No.: 17/294,813

(22) PCT Filed: Nov. 15, 2019

(86) PCT No.: PCT/DK2019/050351
§ 371 (c)(1),
(2) Date: May 18, 2021

(87) PCT Pub. No.: WO2020/103991
PCT Pub. Date: May 28, 2020

(65) Prior Publication Data
US 2022/0003215 A1 Jan. 6, 2022

(30) Foreign Application Priority Data

Nov. 20, 2018 (DK) .......................... PA 2018 70766

(51) Int. Cl.
*F03D 80/30* (2016.01)
*F03D 1/06* (2006.01)
(Continued)

(52) U.S. Cl.
CPC .............. *F03D 80/30* (2016.05); *B29C 70/30* (2013.01); *B29D 99/0025* (2013.01); *F03D 1/0675* (2013.01); *B29L 2031/085* (2013.01)

(58) Field of Classification Search
CPC ....... F03D 80/30; F03D 1/0675; B64D 45/02; B29C 70/30; B29D 99/0025
See application file for complete search history.

(56) References Cited

U.S. PATENT DOCUMENTS 8,043,067 B2 * 10/2011 Kuroiwa ............... F03D 1/0675
416/223 R
9,816,482 B2 * 11/2017 Caruso .................. F03D 1/0633
(Continued)

FOREIGN PATENT DOCUMENTS

EP 3020958 A1 5/2016
WO 2013087078 A1 6/2013
(Continued)

OTHER PUBLICATIONS

Danish Patent and Trademark Office, Search and Examination Report in PA 2018 70766, dated May 28, 2019.
(Continued)

*Primary Examiner* — Eric J Zamora Alvarez
*Assistant Examiner* — Wesley Le Fisher
(74) *Attorney, Agent, or Firm* — Wood Herron & Evans LLP

(57) ABSTRACT

A wind turbine rotor blade has a spar cap including conductive material, and a lightning conductor extending over the spar cap. There is a non-conductive layer between the lightning conductor and the spar cap. An equipotential bonding element electrically bonds the lightning conductor to the spar cap. The non-conductive layer is discontinuous to define a gap, and the equipotential bonding element extends through the gap.

26 Claims, 7 Drawing Sheets

(51) Int. Cl.
*B29C 70/30* (2006.01)
*B29D 99/00* (2010.01)
*B29L 31/08* (2006.01)

(56) References Cited

U.S. PATENT DOCUMENTS

| | | | | |
|---|---|---|---|---|
| 10,066,599 | B2* | 9/2018 | Ohlerich | B29D 99/0028 |
| 10,330,075 | B2* | 6/2019 | March Nomen | F03D 80/30 |
| 10,487,797 | B2* | 11/2019 | Hancock | B29C 70/443 |
| 10,584,684 | B2* | 3/2020 | Nielsen | F03D 1/0675 |
| 10,865,769 | B2* | 12/2020 | Tobin | F03D 3/00 |
| 11,215,167 | B2* | 1/2022 | Girolamo | F03D 1/0675 |
| 2009/0246025 | A1 | 10/2009 | Lewke et al. | |
| 2013/0149153 | A1* | 6/2013 | Fujioka | H02G 13/00 |
| | | | | 416/229 R |
| 2014/0301859 | A1* | 10/2014 | Hancock | B29C 70/443 |
| | | | | 156/60 |
| 2016/0146185 | A1* | 5/2016 | Yarbrough | B32B 5/22 |
| | | | | 156/242 |
| 2017/0122295 | A1 | 5/2017 | Klein | |
| 2018/0156202 | A1* | 6/2018 | Lipka | F03D 80/30 |
| 2019/0353143 | A1* | 11/2019 | Girolamo | B29D 99/0003 |
| 2022/0018328 | A1* | 1/2022 | Bendel | F03D 80/30 |

FOREIGN PATENT DOCUMENTS

| | | |
|---|---|---|
| WO | 2017033249 A1 | 3/2017 |
| WO | 2019068294 A1 | 4/2019 |

OTHER PUBLICATIONS

European Patent Office, International Search Report and Written Opinion in PCT Application No. PCT/DK2019/050351, dated Feb. 3, 2020.

Intellectual Property India, Examination Report issued in corresponding Indian Patent Application No. 202117026552, dated Nov. 17, 2022.

* cited by examiner

Section A-A

Detail B

EQUIPOTENTIAL BONDING OF WIND TURBINE ROTOR BLADE

FIELD OF THE INVENTION

The present invention relates to a wind turbine rotor blade, and in particular to equipotential bonding within the wind turbine rotor blade, and to methods of manufacturing a wind turbine rotor blade.

BACKGROUND OF THE INVENTION

A wind turbine converts kinetic energy of the wind into electrical energy. A generator converts the wind energy captured by a rotor having one or more rotor blades into electrical energy that is usually supplied to a utility grid. The generator is housed in a nacelle together with the various components required to operate and optimize the performance of the wind turbine. A tower supports the load presented by the nacelle and the rotor. In a horizontal axis wind turbine (HAWT) the rotor blades extend radially outwardly from a central hub which rotates about a longitudinal axis aligned generally horizontally. In operation, the blades are configured to interact with the passing air flow to produce lift that causes the rotor to rotate within a plane substantially perpendicular to the direction of the wind.

A conventional rotor blade is made from an outer shell and one or more inner spars in a hollow space bounded by the outer shell. The spar serves to transfer loads from the rotating blade to the hub of the wind turbine. Such loads include tensile and compressive loads directed along the length of the blade arising from the circular motion of the blade and loads arising from the wind which are directed along the thickness of the blade, i.e. from the windward side of the blade to the leeward side. The spar may typically have a hollow tubular section, e.g. generally rectangular hollow tubular section, or a beam section, e.g. I-beam, C-beam, H-beam, Y-beam, X-beam, etc., with one or more shear webs extending between spar caps. The spar caps may be incorporated into the outer shell or may be attached to the outer shell.

The spar cap may include pultruded fibrous strips of material. Pultrusion is a continuous process similar to extrusion, wherein fibres are pulled through a supply of liquid resin and then heated in an open chamber where the resin is cured. The resulting cured fibrous material is of constant cross section but, since the process is continuous, the material once formed may be cut to any arbitrary length.

WO 2013/087078 describes a wind turbine blade with an elongate reinforcing structure comprising a stack of pultruded fibrous composite strips. The pultruded fibres are carbon fibres and extend almost the full length of the blade from root to tip.

The general trend in the wind turbine industry over the past several years has been for wind turbine blades to be made longer. The longer the blades, the larger the rotor and the more wind energy can be captured, improving the efficiency of an individual wind turbine.

Wind turbines are susceptible to lightning strikes. It is common for a wind turbine to include a lighting protection system, which electrically couples the wind turbine components to the ground. The blades, and in particular the blade tips, are particularly susceptible to lighting strikes. The blades therefore typically include a metallic foil, or surface protection layer (SPL), incorporated into the outer shell near the outer surface of the blade. The metallic foil may cover only a portion or substantially the entire blade outer surface. Additionally, or alternatively, the lightning protection system may include one or more discrete lightning receptors. The metallic foil and/or the lightning receptors on the blade are all electrically connected through the tower to ground.

Although lightning strikes have a natural tendency, due to their high frequency, to follow along the outside surface of a structure, such as the rotor blade, the presence of conductive fibres in the blade shell may cause unwanted discharges when a lightning strike occurs that could cause damage to the blade shell. This problem may be exacerbated where the conductive fibres are continuous and extend along a substantial length of the rotor blade, especially for a long blade.

SUMMARY OF THE INVENTION

A first aspect of the invention provides a wind turbine rotor blade spar cap, the spar cap having a length and comprising: a stack comprising a plurality of layers of first conductive material and at least one intermediate layer, wherein the layers of first conductive material each have a length along the length of the spar cap, wherein the intermediate layer is arranged between adjacent layers of the first conductive material, and includes a first portion of second conductive material and a second portion of third material different than the second conductive material, wherein the first portion of second conductive material has a length along the length of the spar cap that is shorter than the length of a shortest one of the adjacent layers of the first conductive material, and wherein the intermediate layer is bonded with the adjacent layers of the first conductive material, and the second conductive material is electrically coupled to the adjacent layers of first conductive material so as to equipotentially bond the adjacent layers of the first conductive material via the second conductive material.

By equipotentially bonding the adjacent layers of the first conductive material via the second conductive material, undesirable discharges or arcs from the spar cap can be avoided.

The spar cap may further comprise alternating layers of the first conductive material and the intermediate layers.

The first conductive material may comprise pultruded fibrous composite material, e.g. carbon fibre reinforced plastic.

The third material may be substantially non-conductive, e.g. a glass fibre material.

The second conductive material may include carbon fibre composite material.

The second conductive material may include a non-conductive fibre fabric wrapped with a conductive fibre material, e.g. a carbon fibre roving, winding or tow.

The second conductive material may include a fibre fabric material containing non-conductive fibres and conductive fibres, e.g. glass fibres and carbon fibres.

The layers of the first conductive material may have varying lengths along the length of the spar cap.

The layers of the first conductive material may be of different lengths such that the thickness of the stack is tapered towards at least one end.

At least one of the layers of the first conductive material may be chamfered at at least one end thereof.

The intermediate layer may have the second portion of third material adjacent the chamfered end(s) of the layer of first conductive material.

The intermediate layer may have the second portion between two spaced first portions along the length of the spar cap.

Longitudinal edges of each layer of first conductive material of the stack may be aligned with each other.

The spar cap according may comprise a plurality of the stacks of layers of first conductive material spaced apart in a chordwise direction of the rotor blade. Each of the stacks having the intermediate layer may be arranged between adjacent layers of the first conductive material.

A further aspect of the invention provides a wind turbine rotor blade including at least one spar cap according to the first aspect.

A further aspect of the invention provides a method of manufacturing a wind turbine rotor blade spar cap, comprising: providing a plurality of layers of first conductive material, each layer having a length along a length of the spar cap; placing an intermediate layer between adjacent layers of the first conductive material so as to form a stack, the intermediate layer having a first portion of second conductive material and a second portion of third material different than the second conductive material, wherein the first portion of second conductive material has a length along the length of the spar cap that is less than the length of the shortest one of the adjacent layers of the first conductive material; electrically coupling the second conductive material to the adjacent layers of first conductive material so as to equipotentially bond the adjacent layers of the first conductive material via the second conductive material; and curing the stack to mechanically bond the intermediate layer to the adjacent layers of the first conductive material.

Placing the intermediate layer between adjacent layers of the first conductive material may further comprise alternating the layers of the first conductive material and the intermediate layers to form the stack.

The second conductive material may include a non-conductive fibre fabric wrapped with a conductive fibre material, and the conductive fibre material of the wrap of the intermediate layer may be electrically coupled to the adjacent layers of first conductive material.

The second conductive material may be a hybrid fabric material containing non-conductive fibres and conductive fibres, and the conductive fibres of the intermediate layer may be electrically coupled to the adjacent layers of first conductive material.

A further aspect of the invention provides a wind turbine rotor blade, comprising: a spar cap including conductive material; a lightning conductor extending over the spar cap; at least one non-conductive layer between the lightning conductor and the spar cap; and an equipotential bonding element electrically bonding the lightning conductor to the spar cap, wherein the at least one non-conductive layer is discontinuous to define a gap, and the equipotential bonding element extends through the gap.

By electrically bonding the lightning conductor to the spar cap, the spar cap is held at the same potential as the lightning conductor such that in the event of a lightning strike undesirable discharges or arcs from the lightning conductor to the spar cap can be avoided.

The spar cap may have a width, and the lightning conductor may extend over at least the full width of the spar cap.

The at least one non-conductive layer may include an overlap region. The gap may be defined between overlapping portions of the at least one discontinuous non-conductive layer.

The equipotential bonding element may have an end attached to and in electrical contact with the lightning conductor, the end being spaced from the spar cap.

The spar cap may have an outer side nearest the at least one non-conductive layer and an inner side nearest an interior of the blade, and wherein the equipotential bonding element is attached to and in electrical contact with the inner side of the spar cap.

The spar cap may have a longitudinal edge, and the equipotential bonding element may be spaced from the longitudinal edge of the spar cap.

The wind turbine rotor blade may further comprise a non-conductive material extending along the longitudinal edge of the spar cap. The non-conductive material may be a core material.

The non-conductive material may be discontinuous to define a second gap. The equipotential bonding element may extend through the second gap.

The equipotential bonding element may be a strip or ribbon. The equipotential bonding element may comprise electrically conductive wire or yarn woven into a fabric.

The equipotential bonding element may be attached to the lightning conductor and to the spar cap, the equipotential bonding element defining a path between an attachment point with the lightning conductor and the spar cap, the path extending from the lightning conductor to the spar cap in a direction only away from the attachment point and not also back towards the attachment point.

The spar cap may include a stack of layers of conductive material. The layers may include carbon fibre material, e.g. pultruded carbon fibre composite material.

The layers of the stack may be of different lengths such that the thickness of the stack is tapered towards at least one end.

Layers of different lengths may define one or more steps, and the equipotential bonding element may be attached to and in electrical contact with the top of the step.

At least one of the layers of the stack may be chamfered at at least one end thereof.

The equipotential bonding element may be electrically bonded to the chamfered end of the layer.

The wind turbine rotor blade may further comprise a plurality of the equipotential bonding elements. Each equipotential bonding element may electrically bond the lightning conductor to a respective layer of the stack of layers of the spar cap.

At least one of the layers of the stack may be electrically bonded to the lightning conductor by a plurality of equipotential bonding elements, wherein one of the equipotential bonding elements is connected adjacent a root end of the blade along the length of the spar cap, and another of the equipotential bonding elements is connected adjacent a tip end of the blade along the length of the spar cap.

The spar cap may include one or more conductive intermediate layers between the layers of conductive material in the stack so as to create an equipotentially bonded spar cap.

The wind turbine rotor blade may further comprise at least one cover layer over the spar cap to sandwich the equipotential bonding element between the spar cap and the cover layer.

The lightning conductor may be a metallic foil of a lightning protection system.

The lightning conductor may be at an outer surface of the blade.

The wind turbine rotor blade may further comprise a stringer including conductive material and located adjacent a trailing edge of the rotor blade, wherein the stringer is electrically bonded to the lightning conductor.

A further aspect of the invention provides a method of manufacturing a wind turbine rotor blade, comprising: laying up a shell of a wind turbine rotor blade, the shell including at least one non-conductive layer and a lightning conductor, wherein the at least one non-conductive layer is discontinuous to define a gap; laying up a spar cap such that the lightning conductor extends over the spar cap and the at least one non-conductive layer is between the lightning conductor and the spar cap, wherein the spar cap includes conductive material; and providing an equipotential bonding element extending through the gap in the non-conductive layer to electrically bond the lightning conductor to the spar cap.

The spar cap may include a stack of layers of conductive material, and the method may further comprise abrading a portion of a surface of one of the layers and attaching the equipotential bonding element to the abraded portion of the layer such that the equipotential bonding element is in electrical contact with the conductive material of the spar cap.

BRIEF DESCRIPTION OF THE DRAWINGS

Embodiments of the invention will now be described with reference to the accompanying drawings, in which.

DETAILED DESCRIPTION OF EMBODIMENT(S)

In this specification, terms such as leading edge, trailing edge, pressure surface, suction surface, thickness, chord and planform are used. While these terms are well known and understood to a person skilled in the art, definitions are given below for the avoidance of doubt.

The term leading edge is used to refer to an edge of the blade which will be at the front of the blade as the blade rotates in the normal rotation direction of the wind turbine rotor.

The term trailing edge is used to refer to an edge of a wind turbine blade which will be at the back of the blade as the blade rotates in the normal rotation direction of the wind turbine rotor.

The chord of a blade is the straight line distance from the leading edge to the trailing edge in a given cross section perpendicular to the blade spanwise direction.

A pressure surface (or windward surface) of a wind turbine blade is a surface between the leading edge and the trailing edge, which, when in use, has a higher pressure than a suction surface of the blade.

A suction surface (or leeward surface) of a wind turbine blade is a surface between the leading edge and the trailing edge, which will have a lower pressure acting upon it than that of a pressure surface, when in use.

The thickness of a wind turbine blade is measured perpendicularly to the chord of the blade and is the greatest distance between the pressure surface and the suction surface in a given cross section perpendicular to the blade spanwise direction.

The term spanwise is used to refer to a direction from a root end of a wind turbine blade to a tip end of the blade, or vice versa. When a wind turbine blade is mounted on a wind turbine hub, the spanwise and radial directions will be substantially the same.

A view which is perpendicular to both of the spanwise and chordwise directions is known as a planform view. This view looks along the thickness dimension of the blade.

Figure 1:
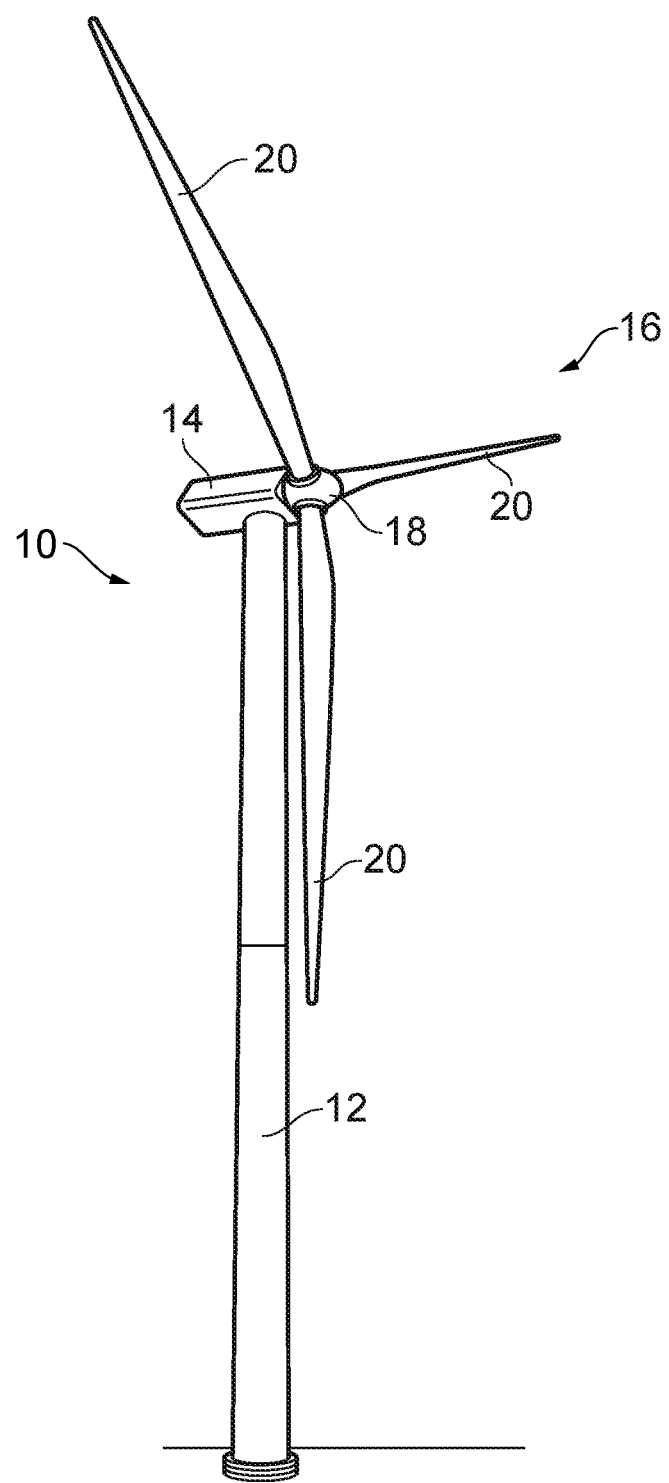
FIG. 1 shows a wind turbine.

FIG. 1 shows a wind turbine 10 including a tower 12 mounted on a foundation and a nacelle 14 disposed at the apex of the tower 12. The wind turbine 10 depicted here is an onshore wind turbine such that the foundation is embedded in the ground, but the wind turbine 10 could be an offshore installation in which case the foundation would be provided by a suitable marine platform.

A rotor 16 is operatively coupled via a gearbox to a generator (not shown) housed inside the nacelle 14. The rotor 16 includes a central hub 18 and a plurality of rotor blades 20, which project outwardly from the central hub 18. It will be noted that the wind turbine 10 is the common type of horizontal axis wind turbine (HAVVT) such that the rotor 16 is mounted at the nacelle 12 to rotate about a substantially horizontal axis defined at the centre at the hub 18. While the example shown in FIG. 1 has three blades, it will be realised by the skilled person that other numbers of blades are possible.

When wind blows against the wind turbine 10, the blades 20 generate a lift force which causes the rotor 16 to rotate, which in turn causes the generator within the nacelle 14 to generate electrical energy.

Figure 2:
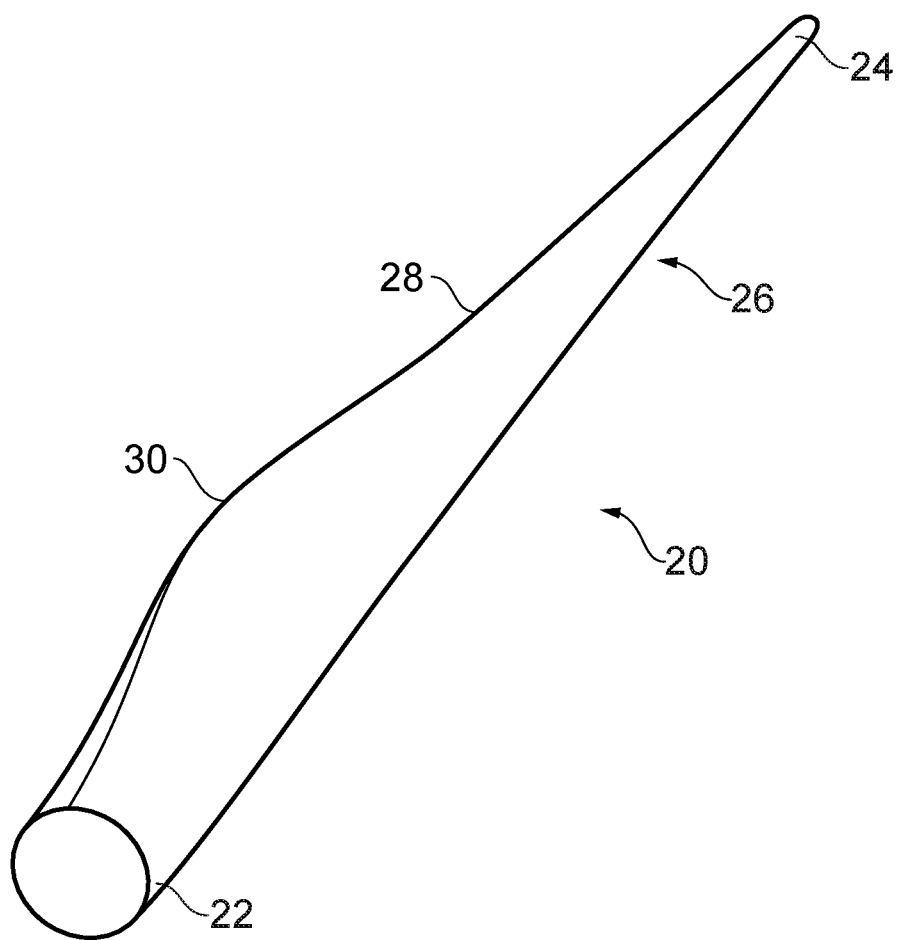
FIG. 2 shows a wind turbine blade.

FIG. 2 illustrates one of the wind turbine blades 20 for use in such a wind turbine. Each of the blades 20 has a root end 22 proximal to the hub 18 and a tip end 24 distal from the hub 18. A leading edge 26 and a trailing edge 28 extend between the root end 22 and tip end 24, and each of the blades 20 has a respective aerodynamic high pressure surface (i.e. the pressure surface) and an aerodynamic low pressure surface (i.e. the suction surface) surface extending between the leading and trailing edges of the blade 20.

Each blade has a cross section which is substantially circular near the root end 22, because the blade near the root must have sufficient structural strength to support the blade outboard of that section and to transfer loads into the hub 18. The blade 20 transitions from a circular profile to an aerofoil profile moving from the root end 28 of the blade towards a "shoulder" 30 of the blade, which is the widest part of the blade where the blade has its maximum chord. The blade 20 has an aerofoil profile of progressively decreasing thickness in an outboard portion of the blade, which extends from the shoulder 30 to the tip end 24.

Figure 3:
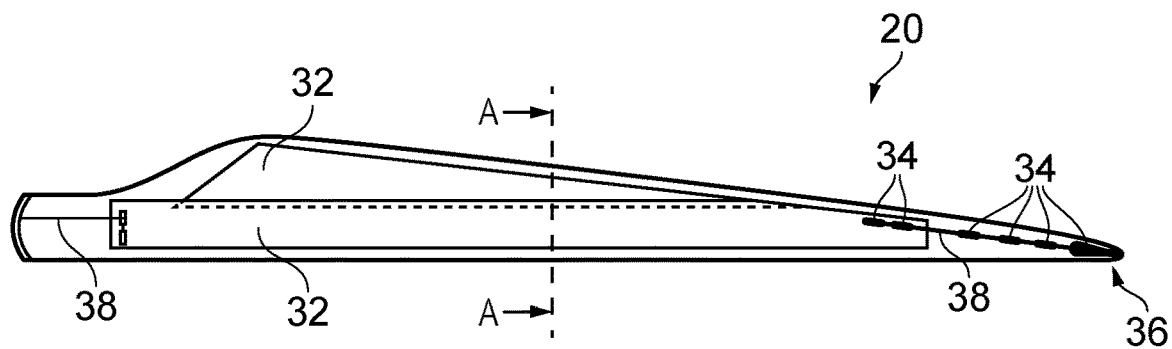
FIG. 3 shows a schematic plan view of a wind turbine blade with lightning protection features.

As shown schematically in FIG. 3, the blade 20 includes one or more lightning conductors which form part of a lightning protection system for the wind turbine. The lightning conductors may take a variety of forms, such as a metallic foil 32 or discrete lightning receptors 34 on the outer surface of the blade, or a solid metal tip 36 conformal with the shape of the blade nearest the tip end 24, for example.

At least some of the lightning conductors may connected to a cable or 'down conductor' 38 that extends inside the blade. The down conductor 38 may be electrically connected to the solid metal tip 36, each of the discrete lightning receptors 34 and the metal foil 32. The majority of the outer surface of the blade 20 may be covered with the metal foil 32. The down conductor may extend substantially the full length of the blade or only a portion of the length of the blade. Where the majority of the outer surface of the blade 20 is covered with the metal foil 32 the down conductor 38 may connect to the metal foil 32 adjacent the tip end 24 of the blade and adjacent the root end 22 of the blade, with no down conductor 38 along the majority of the length of the blade covered with the metal foil 32. Alternatively the blade may have a larger number of the discrete lightning receptors on the blade surface, electrically connected via a down conductor that runs substantially the full length of the blade, instead of having the metal foil.

At the root end 22 of the blade 20, the down conductor 38 may be electrically connected via an armature arrangement to a charge transfer route via the nacelle 14 and tower 12 to a ground potential. Such a lightning protection system therefore allows lightning to be channeled from the blade to a ground potential safely, thereby minimising the risk of damage to the wind turbine 10.

Figure 4:
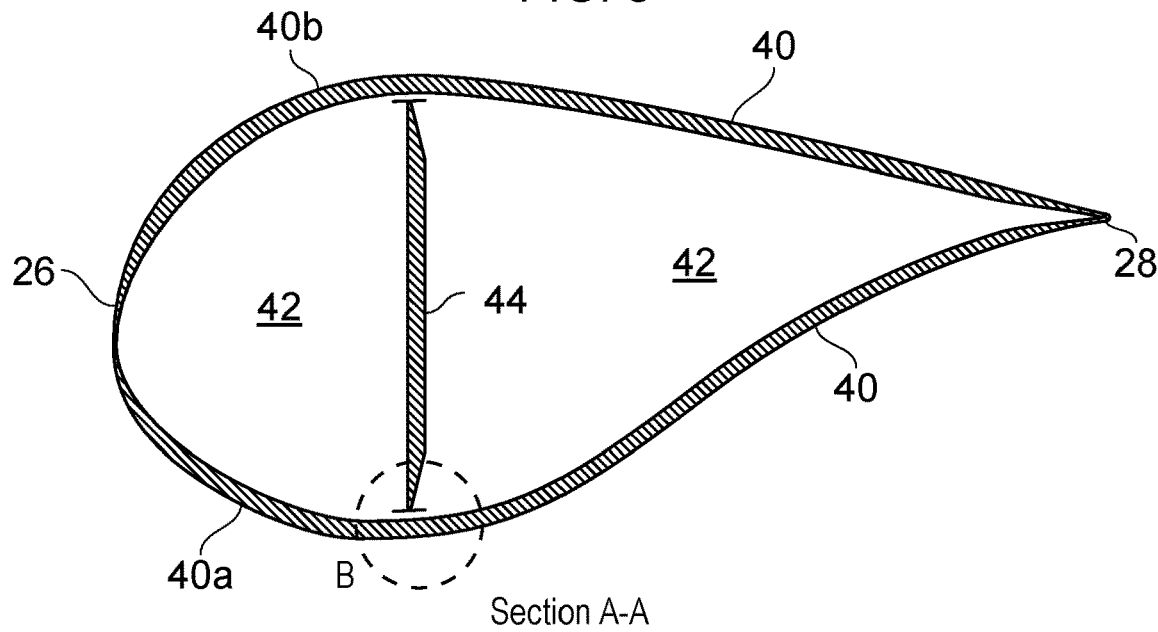
FIG. 4 shows a cross section along A-A of FIG. 3 showing the outer shell and spar structure.

As shown in FIG. 4, the wind turbine blade 20 includes an outer blade shell 40 defining a hollow interior space 42 with a shear web 44 extending internally between upper and lower parts of the blade shell 40. The blade shell 40 may comprise two half-shells 40a, 40b which are separately moulded before being joined together (at the leading edge 26 and the trailing edge 28) to form the blade 20. It will be appreciated that the blade shell 40 need not be formed as two half-shells which are subsequently joined together but may be formed as a unitary shell structure, together with the shear web 42, in a "one shot" single shell process. The blade shell 40 may include a laminate composite material such as glass fibre and/or carbon fibre for example.

Figure 5:
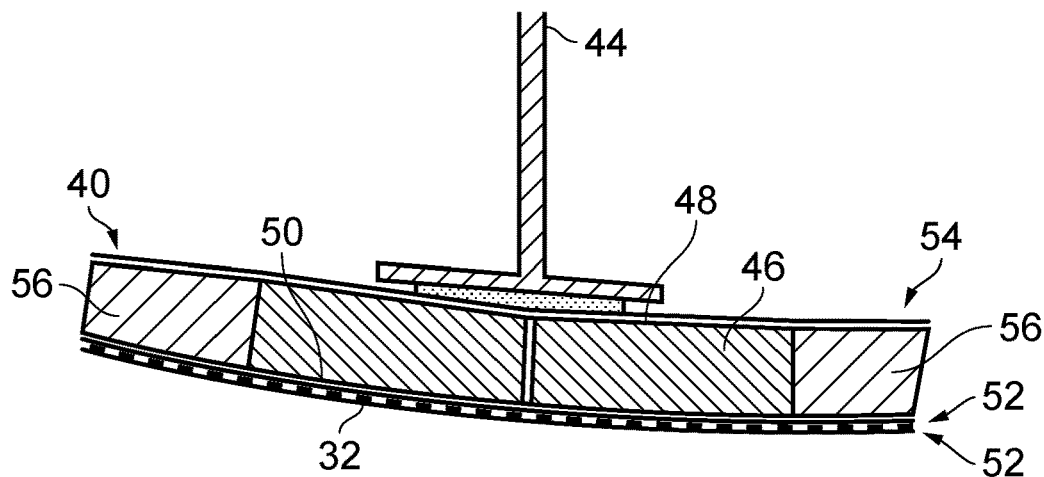
FIG. 5 shows detail B of the outer shell, spar cap and shear web in FIG. 4.

FIG. 5 shows a detail view of the region where the shear web 44 meets the blade shell 40. A spar cap 46 may be incorporated into the outer shell 40, as shown in FIG. 5, or may be attached to the outer shell 40. The spar cap 46 is an elongate reinforcing structure extending substantially along the full length of the blade 20 from the root end 22 to the tip end 24. The spar cap 46 includes conductive material, such as carbon fibres. For example, the spar cap may include pultruded fibrous strips of material such as pultruded carbon fibre composite material or other carbon fibre reinforced plastic material.

The spar cap 46 may include a stack of layers of the conductive material. The shear web 44 may be adhesively bonded to an inner surface 48 of the spar cap 46. An outer surface 50 of the spar cap 46 may sit adjacent the lightning conductor in the outer surface of the blade shell 40. As shown in FIG. 5, the lightning conductor may be in the form of the metal foil 32 which is separated from the outer surface 50 of the spar cap 46 by one or more layers of insulating material 52, such as glass fibre reinforced plastic. One or more further layers 52 of glass fibre reinforced plastic may be provided over the outside of the metallic foil 32. The layers 52 collectively form an outer skin of the blade shell 40. One or more further layers of glass fibre reinforced plastic provide an inner skin 54 of the blade shell 40 with a core material 56 between the outer skin 52 and the inner skin 54. The core material may be a light structural foam, though other core materials such as wood, particularly balsa wood, and honeycomb may alternatively be used to provide a lightweight core material. It will be appreciated that a near identical connection is made between the shear web 44 and the other side of the blade shell 40.

Figure 6:
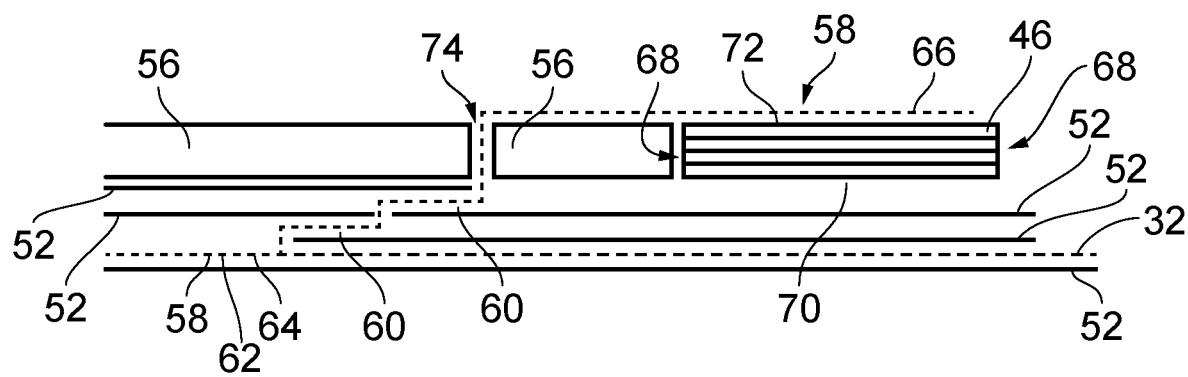
FIG. 6 shows schematically a bonding connection between a metallic foil of the outer shell and the spar cap.

In order to avoid the risk of arcing between the conductive material of the spar cap 46 and the metal foil 32 or other lightning conductor, an equipotential bonding element 58 or "short cut" is used to equipotentially bond the lightning conductor to the conductive material of the spar cap 46. FIG. 6 shows schematically an exploded view of the blade shell layup in the vicinity of the spar cap 46. The one or more non-conductive layers 52 between the lightning conductor 32 and the spar cap 46 are discontinuous to define a gap 60. The equipotential bonding element 58 extends through the one or more gaps 60. In this way the equipotential bonding element 58 defines a path between the lightning conductor 32 and the spar cap 46. By electrically bonding the lightning conductor 32 to the spar cap 46, the spar cap 46 may be held at the same potential as the lightning conductor such that in the event of a lightning strike undesirable discharges or arcs from the lightning conductor to the spar cap can be avoided.

The equipotential bonding element 58 may comprise a strip or ribbon including electrically conductive material. For example, the equipotential bonding element 58 may comprise strands of electrically conductive material, such as metal wire, woven into a fabric material, such as a glass fibre fabric. In an example the conductive material of the equipotential bonding element 58 may be copper coated with tin, for example. The material may be chosen to avoid any galvanic reaction with either the lightning conductor 32 or the conductive material of the spar cap 46. The metal foil lightning conductor is commonly a metal mesh or expanded metal foil made of, for example, aluminium. The copper coated with tin material of the equipotential bonding element 58 avoids a galvanic reaction with either the aluminium foil lightning conductor 32 or the carbon material of the spar cap 46. The glass fibre material of the non-conductive layers 52 between the spar cap 46 and the lightning conductor 32 help avoid a galvanic response between the carbon of the spar cap and the aluminium of the metal foil lightning conductor 32. Of course, it will be appreciated that the lightning conductor 32 may be formed of other suitable materials such as copper, and the choice of conductive material for the equipotential bonding element 58 may be selected according to the other material choices.

The strip or flat ribbon form of the equipotential bonding element 58 that is laid up into the layers 52 of the outer skin of the blade shell helps prevent fatigue of the conductive metal wire in the equipotential bonding element 58. The metallic wire may be woven into the fabric material, in particular glass fibre fabric, so that it is not a foreign entity in the layup with the layers 52 of glass fibre fabric and will infuse with resin without voids during manufacture of the blade shell 40.

By "stepping" the flat ribbon through the glass layers 52 the ribbon is kept as flat as possible. The non-conductive layers 52 may be not only discontinuous but also overlapping in the vicinity of the gap 60 to allow the equipotential bonding element 58 to pass through each layer 52. Where there are multiple non-conductive layers 52, the discontinuities in each layer may be offset to increase the structural integrity of the layup, such that the equipotential bonding element 58 proceeds step-wise through the multiple layers of non-conductive material 52. In the example shown in FIG. 6, the discontinuities in each layer 52 are offset in the chordwise direction of the blade. However, it will be appreciated that two or more of the non-conductive layers 52 may have respective discontinuities defining the respective gaps 60 which do not have an overlap and which gaps are generally aligned in the layup direction such that the equipotential bonding element 58 progresses through multiple ones of the layers 52 through the gaps 60 aligned in the layup or thickness direction of the blade shell 40. In this way, the equipotential bonding element 58 may follow a "S-shaped" rather than stepwise path from an attachment point 62 on the lightning conductor 32 towards the spar cap 46.

The equipotential bonding element 58 may have an end 64 attached to and in electrical contact with the lightning conductor 32 and a second end 66, opposite the first end, attached to and in electrical contact with the conductive material of the spar cap 46. The first end 64 of the equipotential bonding element 58 may be spaced from the spar cap 46. To ensure the electrical contact the equipotential bonding element 58 may be fixed to the lightning conductor 32 and to the conductive material of the spar cap 46 by adhesive to keep it in place during the blade layup process. Alternatively, a pre-preg patch may be placed on top of the equipotential bonding element 58 at each end 64, 66 thereof to keep the equipotential bonding element in place during the blade layup process.

The spar cap 46 has longitudinal edges 68. In order to prevent arcing from the equipotential bonding element 58 to the longitudinal edge 68 of the spar cap 46 it may be desirable that the equipotential bonding element 58 does not run immediately adjacent to the longitudinal edge of the spar cap 46 but instead is spaced from the longitudinal edge. A non-conductive material may extend immediately adjacent along the longitudinal edge 68 of the spar cap 46. In one example, shown in FIG. 6, the non-conductive material is the core material 56 but may be any other non-conductive material.

The spar cap 46 has an outer side 70 nearest the non-conductive layer 52 and an inner side 72 nearest an interior of the blade. The equipotential bonding element 58 may be attached to and in electrical contact with the inner side 72 of the spar cap 46, e.g. as shown in FIG. 6. In order to traverse from the attachment point 62, where the first end 64 of the equipotential bonding element 58 is attached to the lightning conductor 32, to the inner side 72 of the spar cap 46 the equipotential bonding element 58 may need to extend not only through the layers 52 of non-conductive material but also through the core material 56, or other non-conductive material extending along the longitudinal edge 68 of the spar cap 46. Therefore, the non-conductive material may be discontinuous to define a second gap 74 and the equipotential bonding element 58 may extend through the second gap 74. As shown in FIG. 6 the equipotential bonding element 58 may extend stepwise through the layers 52 of non-conductive material and through the core material 56, or other non-conductive material.

The equipotential bonding element 58 may define a path between the attachment point 62 and the spar cap 46 which extends from the lightning conductor 32 to the spar cap 46 in a direction only away from the attachment point 62 and not also back towards the attachment point. That is to say, the equipotential bonding element does not double back on itself in a U-shape. This may prevent arcing from one part of the equipotential bonding element to another part of the equipotential bonding element.

The spar cap 46 may be arranged so as to be equipotentially bonded between the layers of conductive material in the spar cap. This may be achieved using a metallic interlayer between adjacent layers of carbon fibre containing material arranged in a laminate stack. Alternatively, other conductive material may be provided between layers of conductive material so as to equipotentially bond each of the layers of conductive material within the spar cap.

Figure 7:
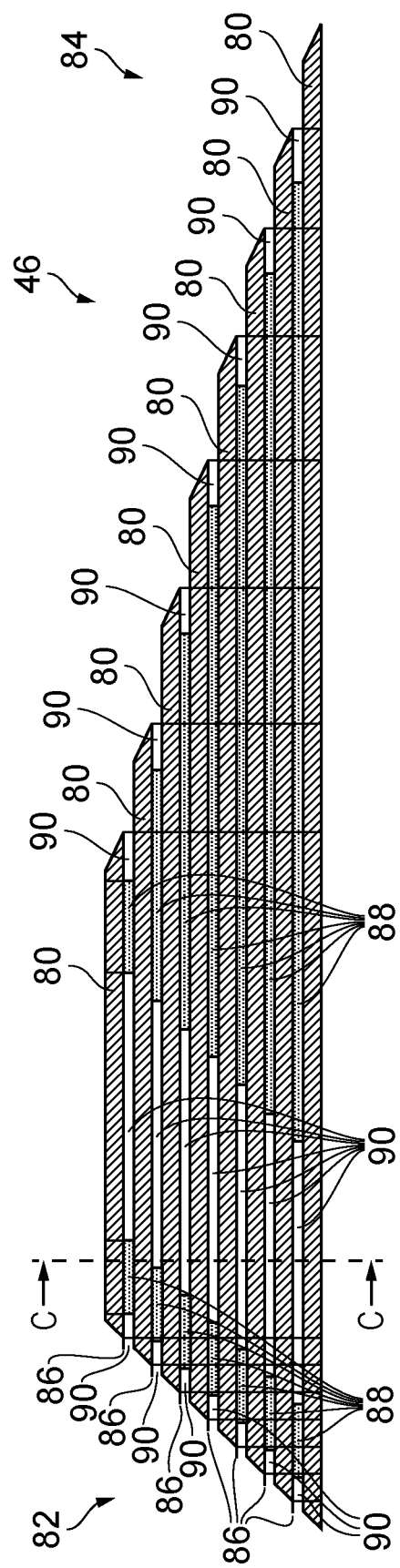
FIG. 7 shows schematically a side view of the stack of layers forming the spar cap.

In one example, shown in FIG. 7, the spar cap 46 includes a stack comprising a plurality of layers of first conductive material 80. The first conductive material may comprise pultruded fibres composite material, for example carbon fibre reinforced plastic. The pultruded fibres are oriented in a longitudinal direction of the spar cap 46 which is aligned with the longitudinal or spanwise direction of the blade 20.

The spar cap 46 may extend over substantially the full length of the blade and has a first end 82 nearest the root end 22 of the blade 20 and a second end 84 adjacent the tip end 24 of the blade. The spar cap 46 has a thickness in the stacking direction of the layers 80 which may vary along the length of the spar cap. At least one of the ends of the spar cap 46 may be tapered in the thickness direction. In the example shown in FIG. 7 both ends of the spar cap are tapered. The taper is formed by cutting each of the layers of first conductive material 80 to different lengths. The taper at the first end 82 may be steeper than the taper at the second end 84. The shallower taper may be created by terminating the layers 80 sequentially in a stepwise manner. Each of the layers 80 may have the same thickness but alternatively the layers 80 may have different thicknesses. The varying thickness of the spar cap 46 along the length of the blade 20 increases from zero nearest the root end 22 and increases to a maximum through the shoulder 30 and then decreases towards the tip end 24 of the blade. At least one of the layers of first conductive material 80 may have a chamfered end, and in the example shown in FIG. 7 each of the layers 80 has a chamfered end at each end of the layer. The chamfers may assist with load transfer to and from the layers 80 of the spar cap 46 into the other material of the blade shell 40.

An intermediate layer 86 is arranged between adjacent layers of the first conductive material 80. Each intermediate layer 86 includes at least one first portion of second conductive material 88, and at least one second portion of third material 90 that is different from the second conductive material. The intermediate layers 86 are provided to bond the adjacent layers of the first conductive material 80 to one another. For example, where the layers of first conductive material 80 comprise pultruded fibrous material, these layers 80 will have a relatively high fibre volume content and the intermediate layers (or inter-layers) 86 may be used to ensure a strong bond between the pultruded fibre layers 80.

By providing at least one portion of the second conductive material 88 in each intermediate layer 86, the second conductive material 88 of the intermediate layer 86 may be electrically coupled to the adjacent layers of first conductive material 80 so as to equipotentially bond the adjacent layers 80 of the first conductive material via the second conductive material. By equipotentially bonding the adjacent layers of the first conductive material 80 via the second conductive material of the first portions 88 of the intermediate layers 86, undesirable discharges or arcs from the spar cap 46 can be avoided in the event of a lightning strike on the blade 20.

The one or more first portions 88 of second conductive material in each intermediate layer 86 may have a length along the length of the spar cap 46 that is shorter than the length of a shortest one of the adjacent layers 80 of the first conductive material. Whilst each intermediate layer 86 may comprise conductive material along the entire length between the first end 82 and the second end 84 of the spar cap 46, there are several advantages associated with providing the second conductive material along only a portion of the length of each intermediate layer 86.

Firstly, the second conductive material may be more economical than the third material in each intermediate layer 86. For example, the second material may be carbon fibre composite material and the third material may be glass fibre composite material. Secondly, the second conductive material may have different material properties to the third material, and the second conductive material may be less well suited than the third material for use in one or more portions of the intermediate layer 86.

For example, under the chamfers at the ends of the layers 80 of first conductive material the loads transferred may be higher than in regions away from the chamfers. It may therefore be advantageous that the third material of the intermediate layer 86, or another material different than the second material, is used under the chamfered ends. For example, the material of the intermediate layer 86 that is used under the chamfers may advantageously be substantially uniform in geometry or have a lower stiffness than the second material so as to better perform in these more highly loaded regions of the spar cap 46. If a more uniform material is used, e.g. has constant thickness, under these chamfers that experience especially high loads this may avoid uneven surfaces under the chamfers which could otherwise result in high fatigue loading, which may be undesirable.

It may be desirable that the length of at least some of the first portions and/or some of the second portions of the intermediate layers 86 are of a standard length to standardise production. For example, in each of the intermediate layers 86 the second portions of third material under the chamfers at the first end 82 are all of a standard length. In a preferred example shown in FIG. 7, each intermediate layer 86 has two first portions 88 of second conductive material with a second portion 90 of third material between the two first portions 88, and with another second portion 90 of third material nearest each of the first and second ends 82, 84 under the chamfered ends of the layer 80 of first conductive material immediately above each intermediate layer 86.

The materials of the first and/or second portions of the intermediate layer 86 may include non-unidirectional fibres, whereas the layers 80 of conductive material may include unidirectional fibres. The layers 80 of first conductive material may have a first thickness and the intermediate layers 86 may have a second thickness. The first thickness may be 10 times greater, and up to 30 times greater, than the second thickness.

As described previously, at least one of the layers 80 of first conductive material may be electrically bonded to the lightning conductor 32 by the equipotential bonding element 58. Where the metal foil lightning conductor 32 extends over substantially the whole of the blade, as shown in FIG. 3, a first one of the equipotential bonding elements 58 may connect to the spar cap 46 at the second (tip) end of the spar cap and a second one of the equipotential bonding elements 58 connects the metal foil lightning conductor 32 to the first (root) end 82 of the spar cap 46.

In another example, the metal foil lightning conductor 32 may extend over only a portion of the blade, e.g. from near the tip end of the blade to a mid-span region of the blade. An internal down conductor cable 38 may be used between this mid-span region and the root end of the blade. The down conductor cable 38 may be directly connected to the metal foil lightning conductor 32. In such a configuration a first one of the equipotential bonding elements 58 may connect to the spar cap 46 at the second (tip) end of the spar cap and a second one of the equipotential bonding elements 58 connects the inboard end of the metal foil lightning conductor 32 to a mid-span region of the spar cap 46. A further equipotential bonding element 58 may connect the down conductor cable 38 to the first (root) end 82 of the spar cap 46.

Whilst each of the rotor blades 20 may experience several lightning strikes during its life the majority of these will be nearest the tip end 24 of the blades 20 and so it is advantageous to electrically bond the second (tip) end 84 of the spar cap 46 to the metal foil lightning conductor 32. Providing the further equipotential bonding element 58 at the first (root) end 82 of the spar cap 46 provides an electrical path out of the spar cap 46 to prevent flashover in the event of a lightning strike.

With the electrical connections provided by the equipotential bonding elements 58 at both the root end and the tip end of the blade there will be a voltage drop between the first and second ends 82, 84 of the spar cap 46. Depending on the length of the blades 20, and particularly on the length of the longest layer of conductive material 80 in the spar cap 46, the value of the voltage drop between the first and second ends 82, 84 of the spar cap 46 will vary. If this voltage drop is below a threshold value at which flashover from the lightning conductor to one or more of the layers 80 of first conductive material may occur then the provision of the equipotential bonding elements 58 at only the ends 82, 84 of the spar cap 46 may be sufficient. However, if the voltage drop between the ends 82, 84 of the spar cap 46 is above the threshold then one or more further equipotential bonding elements 58 may be required to electrically bond the metal foil lightning conductor 32 to an intermediate point of the spar cap 46 between the first and second ends 82, 84.

The equipotential bonding elements 58 may be electrically bonded to either end of at least one of the layers 80 of first conductive material in the spar cap 46. If the equipotential bonding elements 58 are directly attached to only one of the layers 80 of the first conductive material then this layer 80 should be the outermost layer, at the bottom (outermost one) of the stack of layers 80 of the spar cap 46. Further equipotential bonding elements 58 may be directly attached to one or more further layers 80 of the first conductive material, as required. Since each of the layers 80 of first conductive material is equipotentially bonded to each of the other layers 80 by the conductive first portions of the intermediate layers 86 it may not be necessary to provide the equipotential bonding elements 58 directly attached to every one of the layers 80 of the first conductive material, so as to optimise the design. However, of course, the equipotential bonding elements 58 may be directly attached to every one of the layers 80 of the first conductive material.

To ensure good electrical contact between the equipotential bonding element 58 and the conductive material of the spar cap 46, the conductive material in the layer 80 of first conductive material may need to be exposed, i.e. so that it is not covered with (insulating) resin. As described above, the ends of the layers 80 of first conductive material may be chamfered and this chamfering may be used to expose the conductive material to provide a suitable attachment surface for providing a good electrical connection between the conductive materials of the spar cap 46 and the equipotential bonding element 58.

Figure 8:
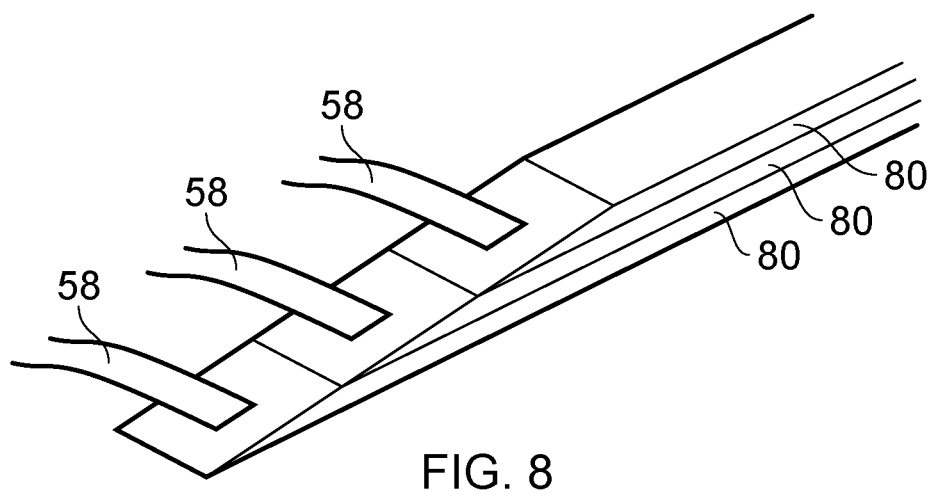
FIG. 8 shows schematically a plurality of bonding connections attached to chamfered ends of layers of the spar cap.

FIG. 8 shows an example where the respective ends of each of a plurality of the layers 80 of first conductive material are chamfered and a respective equipotential bonding element 58 is attached and electrically bonded to the chamfered end of the layer 80. The type of attachment of the equipotential bonding elements 58 to the respective layers 80 of first conductive material may be used at the first end 82 of the spar cap 46. The equipotential bonding element 58 is attached on top of the chamfer. In the case where the layers 80 comprise pultruded conductive fibrous material, the chamfered end will expose the conductive fibres, i.e. they will not be covered with (insulating) resin when the equipotential bonding element 58 is attached to the chamfered end. The chamfered ends may be formed by grinding, or other known processes.

One disadvantage of attaching the equipotential bonding element 58 to the chamfered end of the layer 80 is that a stress concentration at the chamfered end may result. If this stress concentration takes the local stress above a desired threshold value then it may be desirable to attach the equipotential bonding element 58 to the layer 80 away from the chamfered end. Unlike the arrangement shown in FIG. 8, where the chamfered ends of the stack of layers 80 of first conductive material form a substantially continuous slope in the taper of the stack thickness, in the arrangement shown in FIG. 9 the ends of the layers 80 of first conductive material are terminated in a stepwise manner. Therefore the chamfered ends of the layers 80 do not form a continuous slope but form a series of ramps with lands in between, where the lands are provided by the top (innermost with respect to the blade) surface of the layer 80 of first conductive material between the chamfers.

If the conductive material is not exposed at the top surface of these lands then a poor electrical connection may result when the equipotential bonding element 58 is attached to the land. For example, the top surface of the layer 80 may be insulating resin material. Consequently, it may be appropriate to remove material to expose the conductive material of the layer 80 at these lands prior to attachment of the equipotential bonding element 58. This material removal may be done by grinding, etching, or laser or chemical activation, or a variety of other known processes. Once the material has been removed to expose the conductive material at these lands then the respective equipotential bonding elements 58 may be attached and electrically bonded to the layers 80 at these lands.

Figure 9:
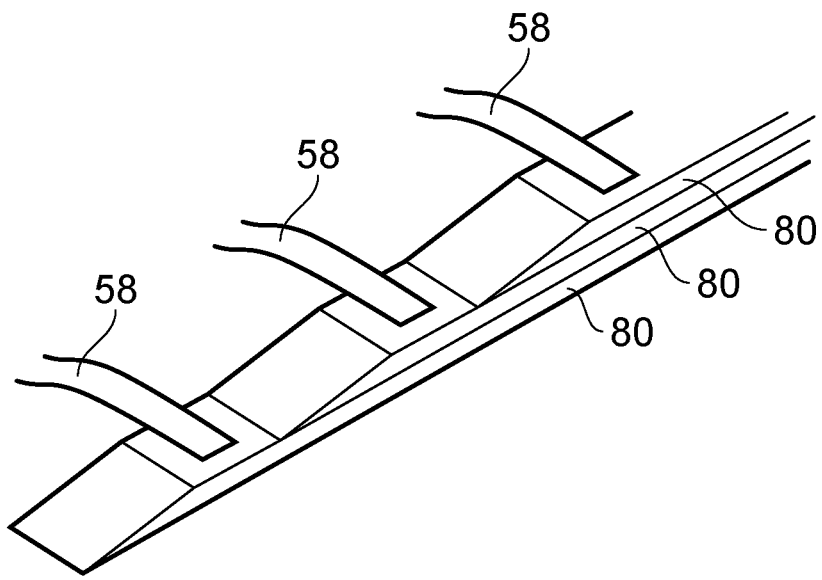
FIG. 9 shows schematically a plurality of bonding connections attached to lands at ends of layers of the spar cap.

Whilst in FIGS. 8 and 9 a purely exemplary stack of three layers 80 of first conductive material is illustrated, each with a respective equipotential bonding element 58 attached, it will be appreciated that there need not be an equipotential bonding element 58 attached to each of the layers 80 of first conductive material for the reasons as set out above.

The equipotential bonding element 58 may be adhesively bonded to the spar cap 46 to keep it located during manufacture of the blade. In the case where the equipotential bonding element 58 includes a dry fibre fabric material the adhesive may be introduced through the fabric material of the equipotential bonding element 58 from opposite the attachment side for attachment to the spar cap 46, prior to infusing the blade with resin. As an alternative to using adhesive, a pre-preg material patch with its tacky side facing down may be applied over the top of the equipotential bonding element 58 so that the patch extends beyond the edge of the equipotential bonding element 58 and sticks to the spar cap 46 to hold the equipotential bonding element 58 in place. It is desirable to avoid voids or non-conductive material between the equipotential bonding element 58 and the exposed conductive material of the spar cap 46, and also between the equipotential bonding element 58 and the lightning conductor 32. In another example, the equipotential bonding element 58 may be placed over the spar cap 46 and then secured to adjacent core material with plastic fasteners, to keep it located during manufacture of the blade.

After the equipotential bonding elements 58 are placed on the spar cap 46 further layers such as the layers 54 of glass fibre may be added on top (inner side with respect to the blade) of the spar cap 46 and the core material 56 to hold the equipotential bonding elements 58 in place during manufacture of the blade 20.

Figure 10:
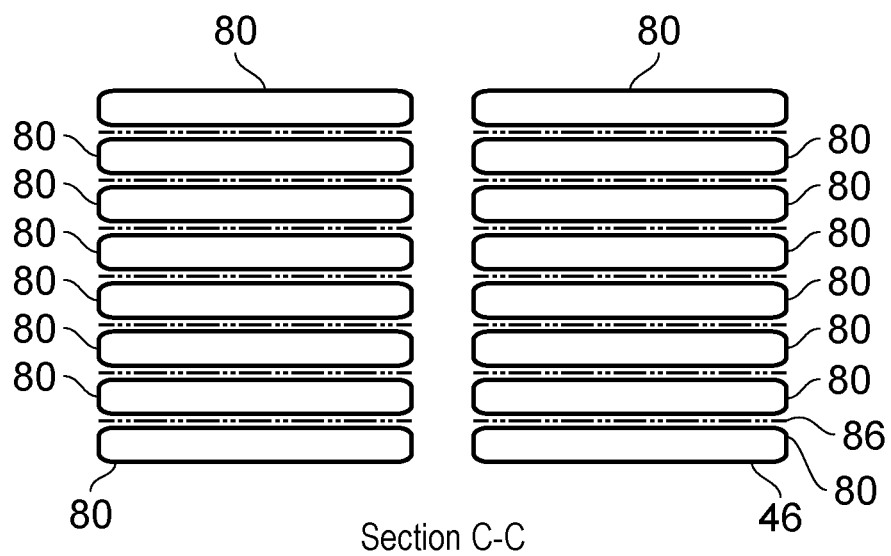
FIG. 10 shows schematically a cross-section along C-C of FIG. 7.

Depending on the stiffness of the material of the spar cap 46 and the local curvature of the shape of the shell 40 of the blade 20 it may be desirable to construct the spar cap 46 as two or more stacks arranged in a chordwise direction, as shown in the section view of FIG. 10. Each of the stacks may be constructed substantially identically. When the stacks are laid up into the blade the stacks may have touching adjacent longitudinal edges. Where the spar cap 46 comprises more than one stack of the layers 80 of first conductive material, the stacks may be equipotentially bonded together. This may be achieved by either repeating the process of electrically bonding one or more of the layers 80 of each of the stacks to the same lightning conductor 32 or alternatively by providing an equipotential bonding element 58 between at least one of the layers 80 of each of the stacks forming the spar cap 46.

Whilst in the above described examples the equipotential bonding element 58 is attached to the top or inner surface of the layer 80 of first conductive material it will be appreciated that the equipotential bonding element 58 could be attached to the lower or outermost side of the layer 80. In the case where the attachment of the equipotential bonding element 58 is to the outermost side of the layer, the surface may still need to be prepared to expose the conductive material of the layer.

Figure 11:
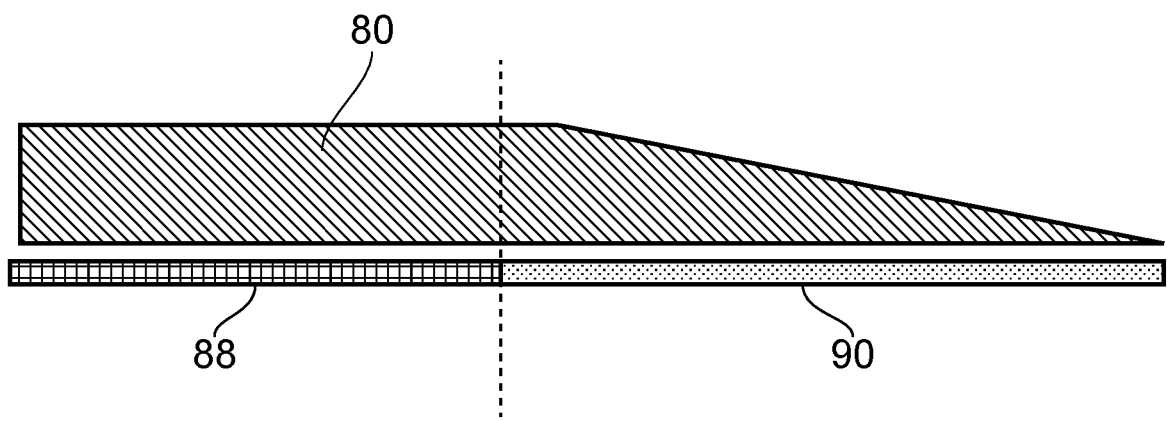
FIG. 11 shows schematically detail of the layers at one end of the spar cap.

FIG. 11 shows a detail view of the end of one of the layers 80 of first conductive material having a chamfer at one end, with the intermediate 86 layer beneath. In the intermediate layer 86, the first portion 88 of second conductive material extends beneath the full (constant) thickness region of the layer 80, and the second portion 90 of third material extends beneath the chamfered end of the layer 80. The second portion 90 may also extend under the full thickness region of the layer 80 a short distance.

Figure 12:
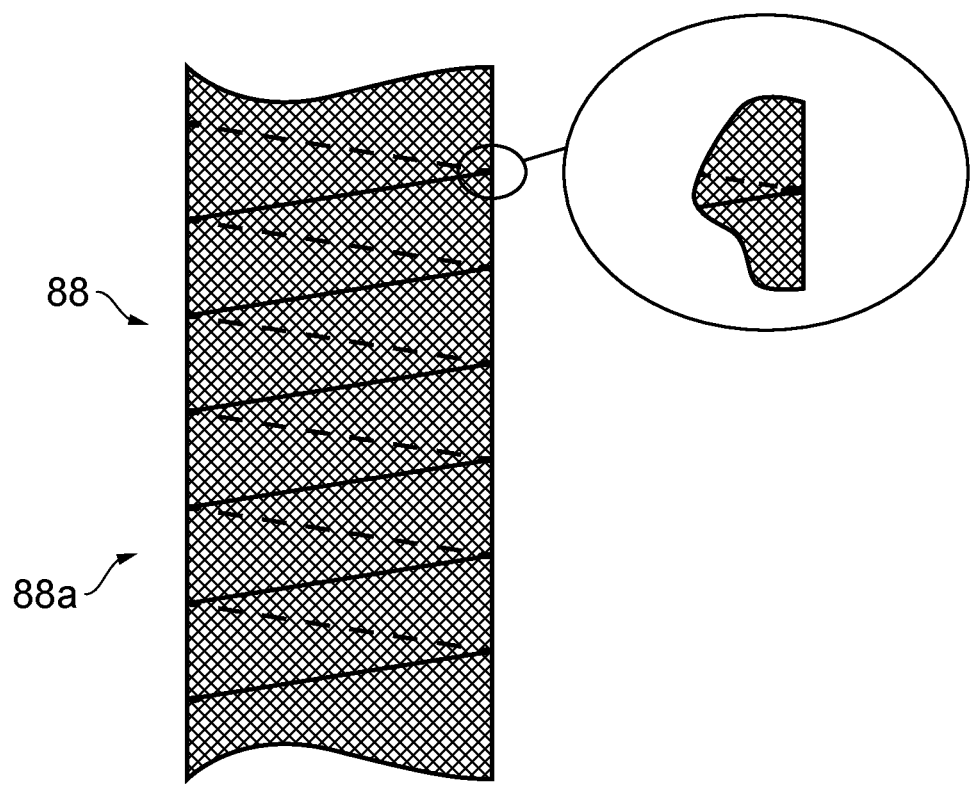
FIG. 12 shows schematically one example of a material used in the spar cap.
Figure 13:
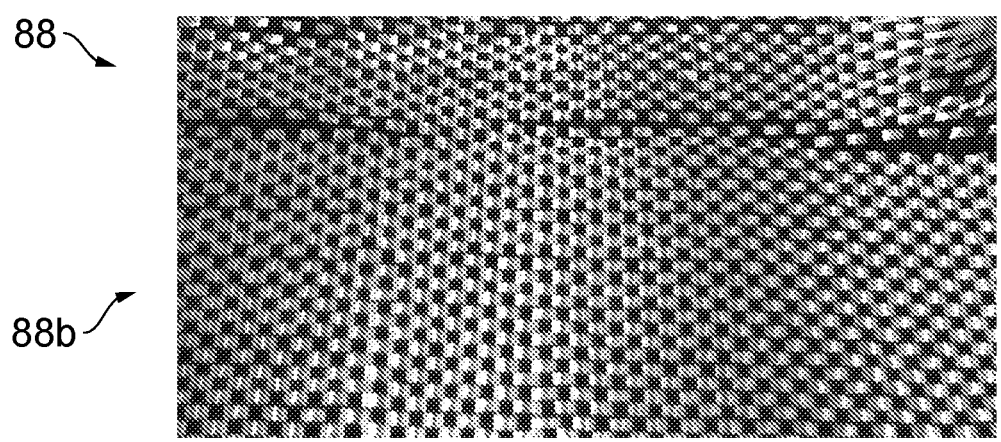
FIG. 13 shows schematically another example of a material used in the spar cap.

In the intermediate layer 86 the first portion 88 of second conductive material may take a variety of different forms. In a first example the first portion may comprise a second conductive material 88a as shown in FIG. 12 which includes a non-conductive fibre fabric wrapped with a conductive fibre material. The conductive fibre material may include carbon fibre, such as a carbon fibre roving, winding or tow. The non-conductive fibre fabric may be a glass fibre fabric. In a second example, the second conductive material 88b shown in FIG. 13 may include a fibre fabric material containing non-conductive fibres and conductive fibres, e.g. glass fibres and carbon fibres, to form a hybrid fabric.

In the conductive material 88a, the glass fabric may be a pre-preg material. In the conductive material 88b, the hybrid fabric material may be a dry fibre fabric. This dry fibre material may preferably be used when the blade outer shell 40 is to undergo resin infusion during manufacture such that the resin infuses also into the hybrid fabric of the first portion 88 of the intermediate layer 86. Of course, the fabric of the conductive material 88a may alternatively include pre-preg material, or semi-preg material, or the fabric of the conductive material 88*b* may be a dry fibre fabric for subsequent resin infusion. With a pre-preg or semi-preg material, the conductive material may be dry or have only a very light resin covering so that there is substantially no insulating material between the conductive material of the intermediate layer and the conductive material of the spar cap.

During manufacturing of the blade, the blade shell 40 is laid up as described above. Where the layers 52, 54, e.g. of glass fibre material, are dry fibre fabric the layup undergoes a resin infusion, consolidation and curing process to fully infuse the fabric with resin which then cures to bond (mechanically) the structure of the blade shell 40 together. During this process, the fibre fabric of the intermediate layer or layers 86 and/or the fibre fabric of the equipotential bonding element or elements 58, where these are dry fibre fabric material, will also infuse with the resin which is consolidated and cured in the same process.

Alternatively, the blade shell 40 may include layers 52, 54 of pre-preg material. In this case the layup will not need to undergo a resin infusion process but will undergo a consolidation and curing process to bond (mechanically) the structure of the blade shell 40 together. During this process, the fibre fabric of the intermediate layer or layers 86 and/or the fibre fabric of the equipotential bonding element or elements 58, where these also include pre-preg fabric materials, will be consolidated and cured in the same process.

By either process, the consolidation may ensure the conductive material of the first portion 88 of the intermediate layer 86 is electrically coupled to the adjacent layers 80 of first conductive material, and curing mechanically bonds the intermediate layer 86 to the adjacent layers 80 of first conductive material.

The wind turbine blade 20 is shown as a single complete blade but in other examples the blade may be a 'split' or 'segmented' blade which comprises a plurality of blade portions which are joined together to form the complete blade. For instance, the wind turbine blade may include a first wind turbine blade portion and a second wind turbine blade portion, which may be connected at a joint interface to form the blade. It will be understood that a blade may have three or more blade portions with a joint between adjacent blade portions.

The width of the stack of layers of first conductive material in the spar cap may be substantially constant to define parallel longitudinal edges of the stack, or the width may vary along the length of the of the spar cap.

The wind turbine rotor blade may further comprise a stringer in the form of a trailing edge stringer or secondary spar adjacent the trailing edge of the blade. The stringer may be incorporated in the blade shell 40. The stringer may extend longitudinally along the length of the blade from root to tip, or along at least a portion of that length. A stringer may be provided in each half of the blade shell, 40*a*, 40*b*. Typically no shear web extends between the stringers. If a shear web is present then the shear web and 'stringers' will form a secondary spar structure in which the 'stringers' form the spar caps. The stringer or secondary spar may include conductive material, e.g. carbon fibre material. The carbon fibre material may be unidirectional aligned with the longitudinal direction of the blade. The carbon fibre material may include pultruded fibrous material, similar to the spar caps described previously. Where the stringers or spar caps of the secondary spar include conductive material, this may be electrically bonded to the lightning conductor. The electrical bonding may be arranged similarly to that as for the spar caps described previously.

Although the invention has been described above with reference to one or more preferred embodiments, it will be appreciated that various changes or modifications may be made without departing from the scope of the invention as defined in the appended claims.

The invention claimed is:

1. A wind turbine rotor blade, comprising:
a spar cap including conductive material;
a lightning conductor extending over the spar cap;
at least one non-conductive layer between the lightning conductor and the spar cap; and
an equipotential bonding element electrically bonding the lightning conductor to the spar cap,
wherein the at least one non-conductive layer is discontinuous to define a gap, and the equipotential bonding element extends through the gap; and
wherein the at least one non-conductive layer includes an overlap region, and the gap is defined between overlapping portions of the at least one discontinuous non-conductive layer.

2. The wind turbine rotor blade according to claim 1, wherein the spar cap has a width, and the lightning conductor extends over at least the full width of the spar cap.

3. The wind turbine rotor blade according to claim 1, wherein the equipotential bonding element has an end attached to and in electrical contact with the lightning conductor, the end being spaced from the spar cap.

4. The wind turbine rotor blade according to claim 1, wherein the spar cap has a longitudinal edge, and wherein the equipotential bonding element is spaced from the longitudinal edge of the spar cap.

5. The wind turbine rotor blade according to claim 4, further comprising a non-conductive material extending along the longitudinal edge of the spar cap.

6. The wind turbine rotor blade according to claim 5, wherein the non-conductive material is a core material.

7. The wind turbine rotor blade according to claim 1, wherein the equipotential bonding element is a strip or ribbon.

8. The wind turbine rotor blade according to claim 7, wherein the strip or ribbon comprises electrically conductive wire or yarn woven into a fabric.

9. The wind turbine rotor blade according to claim 1, wherein the equipotential bonding element is attached to the lightning conductor and to the spar cap, the equipotential bonding element defining a path between an attachment point with the lightning conductor and the spar cap, the path extending from the lightning conductor to the spar cap in a direction only away from the attachment point and not also back towards the attachment point.

10. The wind turbine rotor blade according to claim 1, wherein the spar cap includes a stack of layers of conductive material.

11. The wind turbine rotor blade according to claim 10, wherein the layers of the stack are of different lengths such that the thickness of the stack is tapered towards at least one end.

12. The wind turbine rotor blade according to claim 11, wherein the layers of different lengths define a step, and the equipotential bonding element is attached to and in electrical contact with a top of the step.

13. The wind turbine rotor blade according to claim 10, wherein at least one of the layers of the stack is chamfered at at least one end thereof.

14. The wind turbine rotor blade according to claim 13, wherein the equipotential bonding element is electrically bonded to the at least one chamfered end of the layer.

15. The wind turbine rotor blade according to claim 10, further comprising a plurality of the equipotential bonding elements, each equipotential bonding element electrically bonds the lightning conductor to a respective layer of the stack of layers of the spar cap.

16. The wind turbine rotor blade according to claim 15, wherein at least one of the layers of the stack is electrically bonded to the lightning conductor by a plurality of equipotential bonding elements, wherein one of the equipotential bonding elements is connected adjacent a root end of the blade along the length of the spar cap, and another of the equipotential bonding elements is connected adjacent a tip end of the blade along the length of the spar cap.

17. The wind turbine rotor blade according to claim 10, wherein the spar cap includes one or more conductive intermediate layers between the layers of conductive material in the stack so as to create an equipotentially bonded spar cap.

18. The wind turbine rotor blade according to claim 10, wherein the stack of layers of conductive material includes carbon fibre material or pultruded carbon fibre composite material.

19. The wind turbine rotor blade according to claim 1, further comprising at least one cover layer over the spar cap to sandwich the equipotential bonding element between the spar cap and the cover layer.

20. The wind turbine rotor blade according to claim 1, wherein the lightning conductor is a metallic foil of a lightning protection system.

21. The wind turbine rotor blade according to claim 1, wherein the lightning conductor is at an outer surface of the blade.

22. The wind turbine rotor blade according to claim 1, further comprising a stringer including conductive material and located adjacent a trailing edge of the rotor blade, wherein the stringer is electrically bonded to the lightning conductor.

23. A method of manufacturing a wind turbine rotor blade, comprising:
   laying up a shell of the wind turbine rotor blade, the shell including at least one non-conductive layer and a lightning conductor, wherein the at least one non-conductive layer is discontinuous to define a gap, and wherein the at least one non-conductive layer includes an overlap region, and the gap is defined between overlapping portions of the at least one discontinuous non-conductive layer;
   laying up a spar cap such that the lightning conductor extends over the spar cap and the at least one non-conductive layer is between the lightning conductor and the spar cap, wherein the spar cap includes conductive material; and
   providing an equipotential bonding element extending through the gap in the non-conductive layer to electrically bond the lightning conductor to the spar cap.

24. The method of manufacturing according to claim 23, wherein the spar cap includes a stack of layers of conductive material, and the method further comprises abrading a portion of a surface of one of the layers and attaching the equipotential bonding element to the abraded portion of the layer such that the equipotential bonding element is in electrical contact with the conductive material of the spar cap.

25. A wind turbine rotor blade, comprising:
   a spar cap including conductive material;
   a lightning conductor extending over the spar cap;
   at least one non-conductive layer between the lightning conductor and the spar cap; and
   an equipotential bonding element electrically bonding the lightning conductor to the spar cap,
   wherein the at least one non-conductive layer is discontinuous to define a gap, and the equipotential bonding element extends through the gap, and
   wherein the spar cap has an outer side nearest the at least one non-conductive layer and an inner side nearest an interior of the blade, and wherein the equipotential bonding element is attached to and in electrical contact with the inner side of the spar cap.

26. A wind turbine rotor blade, comprising:
   a spar cap including conductive material;
   a lightning conductor extending over the spar cap;
   at least one non-conductive layer between the lightning conductor and the spar cap;
   a non-conductive material extending along a longitudinal edge of the spar cap; and
   an equipotential bonding element electrically bonding the lightning conductor to the spar cap,
   wherein the at least one non-conductive layer is discontinuous to define a gap, and the equipotential bonding element extends through the gap, and
   wherein the non-conductive material is discontinuous to define a second gap, and the equipotential bonding element extends through the second gap.

* * * * *